July 15, 1941.  C. I. CROW  2,249,684
TRUCK TRAILER LOADING DEVICE
Filed July 23, 1940   3 Sheets-Sheet 1
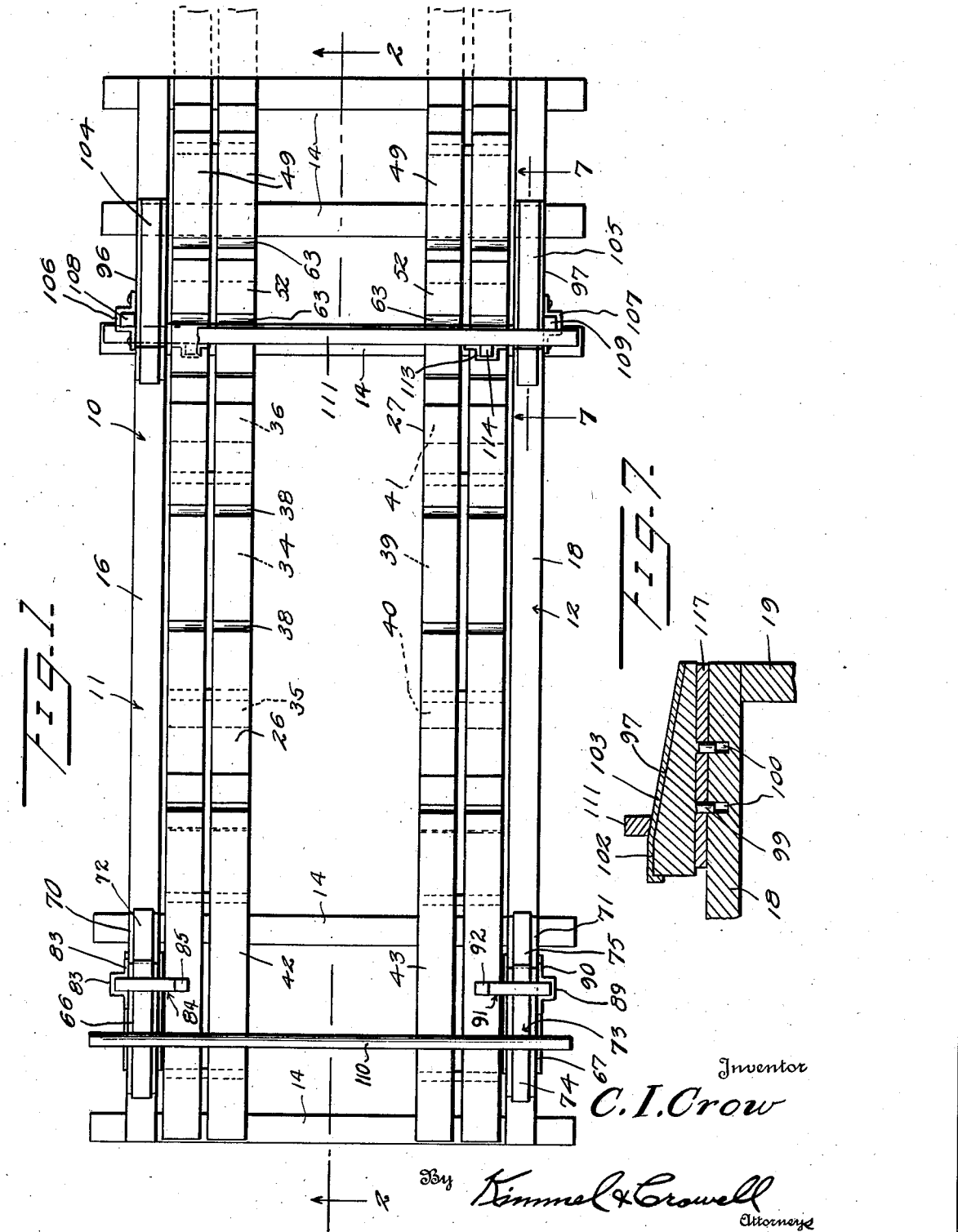
Inventor
C. I. Crow
By Kimmel & Crowell
Attorneys July 15, 1941.  C. I. CROW  2,249,684
TRUCK TRAILER LOADING DEVICE
Filed July 23, 1940   3 Sheets-Sheet 2
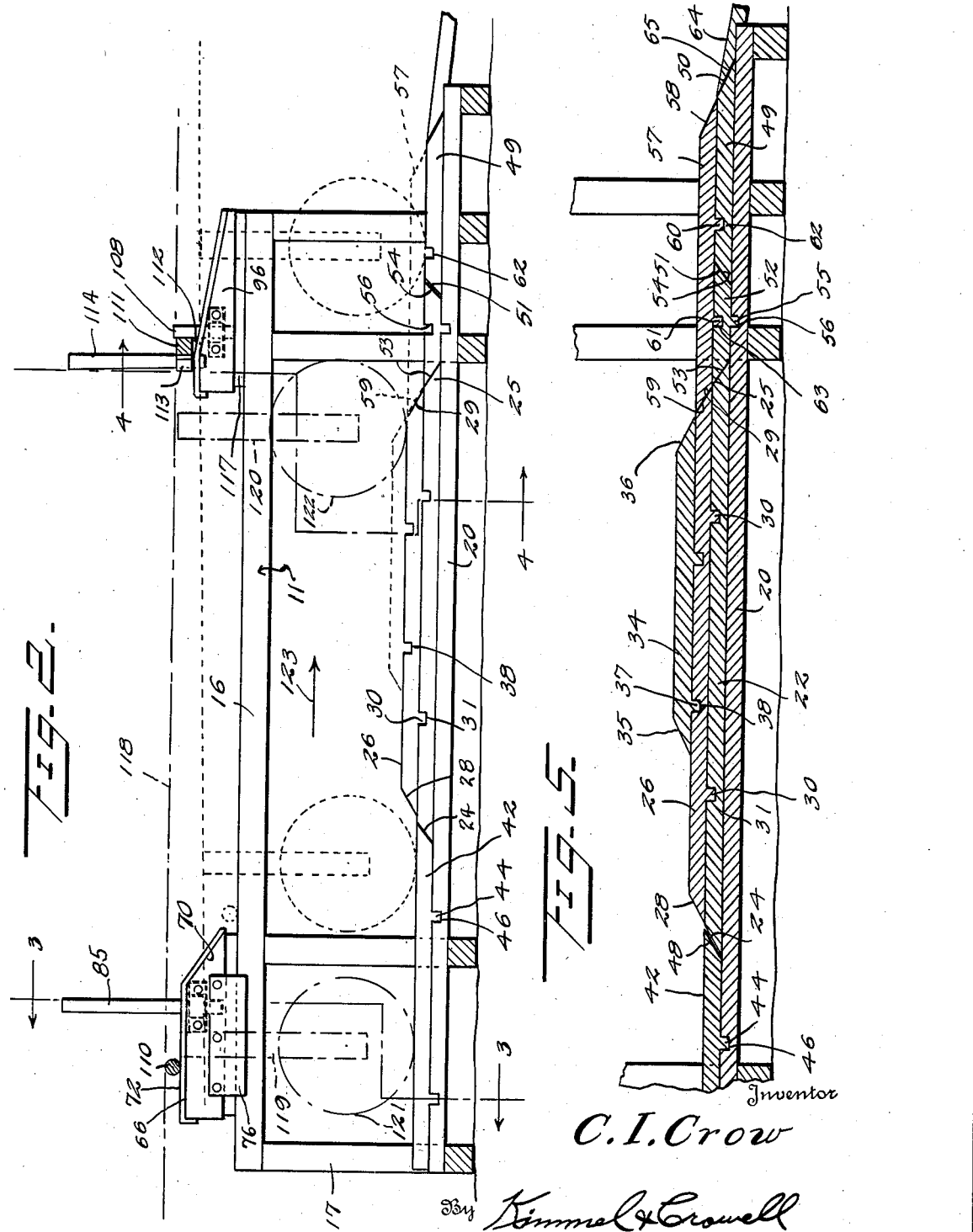
Inventor
C. I. Crow
By Kimmel & Crowell
Attorneys

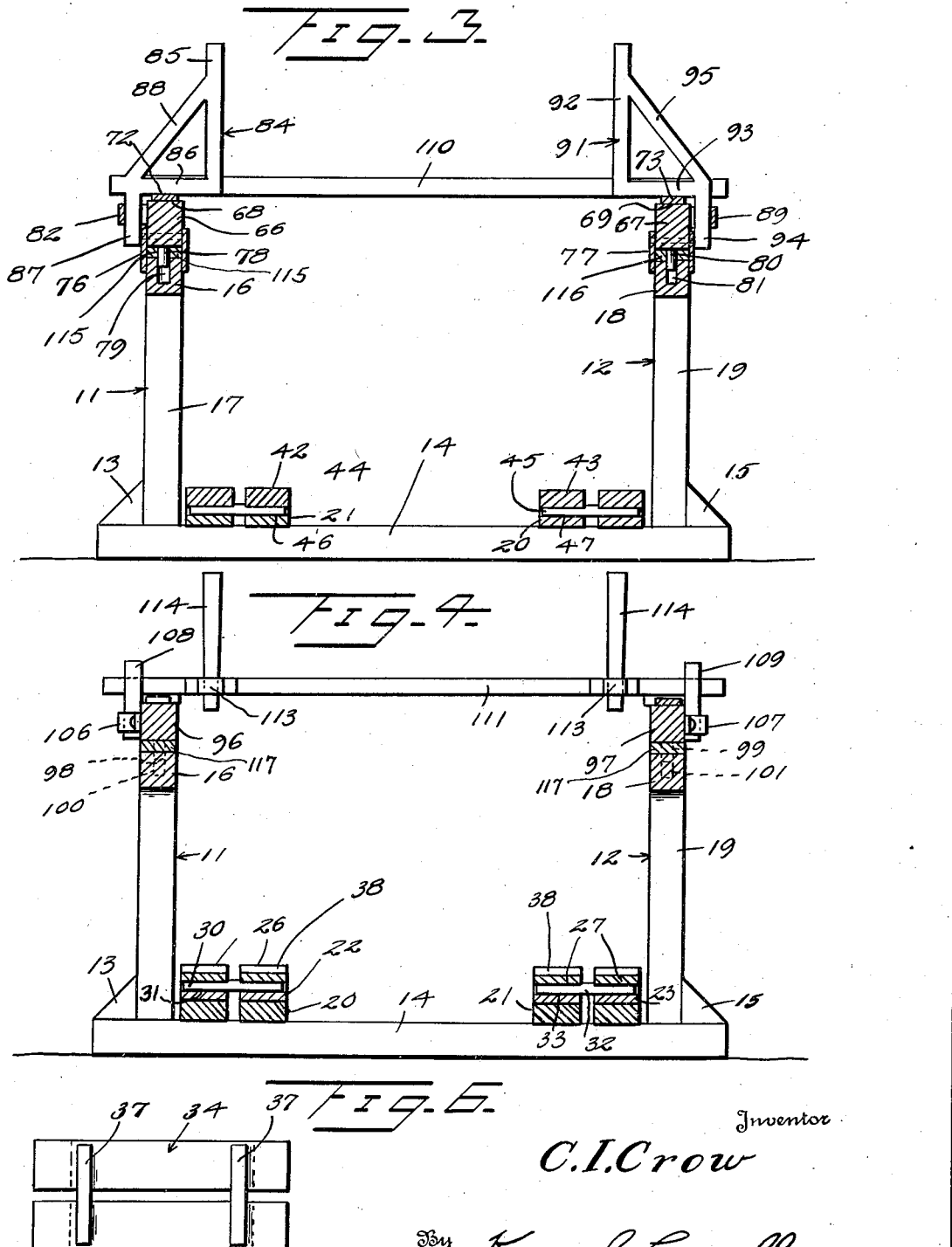

Patented July 15, 1941

2,249,684

UNITED STATES PATENT OFFICE 2,249,684

TRUCK TRAILER LOADING DEVICE

Coy I. Crow, Zwolle, La.

Application July 23, 1940, Serial No. 347,060

10 Claims. (Cl. 214—41)

This invention relates to a loading device for loading in a single operation a complete load for a vehicle.

An object of this invention is to provide a structure whereby one person may easily and quickly deposit a full load on a vehicle, such as a trailer or the like.

Another object of this invention is to provide a device whereby a load may be placed on a vehicle without jar or strain to either the vehicle or load.

A further object of this invention is to provide a device of this kind which may be adapted to place full loads on vehicles of different kinds, that is, vehicles wherein the bodies or bolsters are of different heights from the ground.

A still further object of this invention is to provide a device of this kind which may be of a portable nature so that it can be readily shifted to the desired location.

A further object of this invention is to provide a device of this kind which will eliminate lost time now experienced in loading a vehicle.

A further object of this invention is to provide a device of this kind which will handle long articles, such as lumber, logs, rails, pipes, beams or the like, one person being able in a very short space of time to take on the complete load as a unit irrespective of the total weight of the load.

Embodying the foregoing objects and to others which may hereinafter appear, the invention consists of the novel construction, combination and arrangement of parts as will be more specifically referred to and as illustrated in the accompanying drawings, wherein are shown embodiments of the invention, but it is to be understood that changes, variations and modifications may be resorted to which fall within the scope of the invention as claimed.

In the drawings:

Figure 1 is a top plan of a vehicle loading device constructed according to an embodiment of this invention, Figure 2 is a sectional view taken on the line 2—2 of Figure 1, Figure 3 is a sectional view taken on the line 3—3 of Figure 2, Figure 4 is a sectional view taken on the line 4—4 of Figure 2, Figure 5 is a fragmentary longitudinal section of the track structure showing an auxiliary vehicle elevating track mounted on the normal track structure, Figure 6 is a bottom plan of the auxiliary track structure, and Figure 7 is a fragmentary sectional view taken on the line 7—7 of Figure 1.

Referring to the drawings, the numeral 10 designates generally a frame structure comprising a pair of upright side members 11 and 12, which are secured to a plurality of transversely disposed parallel base members 14. The side member 11 is braced relative to the base members 14 by bracing members 13 and the side member 12 is braced relative to the base members 14 by bracing members 15. The side member 11 comprises an upper rail or beam 16, which is mounted on the upper ends of a plurality of upright posts or beam supporting members 17. The posts or beam supporting members 17 are secured at their lower ends in any suitable manner to the base members 14. The side member 12 comprises an upper horizontal rail or load supporting member 18, which is mounted on the upper ends of a plurality of vertical uprights or posts 19. The uprights or posts 19 are secured at their lower ends in any suitable manner to the transverse base members 14. A pair of double base or lower track members 20 and 21 are disposed in spaced apart parallel relation and are fixed in any suitable manner to the base members 14 between the two side members 11 and 12. A truck elevating track member 22 is carred by the track 20 intermediate the ends thereof and the truck elevating track 22 is adapted to be fixed in any suitable manner to the track 20. The track 21 has fixed to the upper surface thereof a truck elevating track 23 similar to the track 22 and each of these tracks 22 and 23 is formed with a downwardly and rearwardly inclined surface 24. Each of these track members is also provided with a forwardly and downwardly inclined surface 25 at the forward ends thereof. A second truck elevating track structure 26 is mounted on top of the track 22 and a similar truck elevating structure 27 is mounted on the track 23. The forward and rear ends of the two tracks 26 and 27 are inclined, as at 28 and 29 on an angle similar to the angles of the surfaces 24 and 25.

The track structure 26 has secured to the under side thereof a pair of transversely disposed ribs or cleats 30, which are adapted to engage in transversely disposed grooves 31 formed in the track member 22. The track member 27 has secured to the under surface thereof a pair of transversely extending cleats 32, which are adapted to engage in transversely disposed grooves or channels 33 formed in the track member 21. An upper removable track member 34 is adapted to engage on the upper surface of the track member 26 and is formed with inclined opposite end portions 35 and 36. The upper track member 34 has secured to the under side thereof a pair of transversely disposed cleats 37, which are adapted to engage in grooves 38 formed in the track member 26. The track member 34 is substantially shorter in length than the track member 26 and is adapted to be used only when the height of the bolster on the truck is not sufficient to permit engagement between the bolster and the load, as will be hereinafter described. The track member 27 may also have positioned on the upper surface thereof an upper track member or block 39, which is constructed similar to the track 34, being formed with beveled rear and forward edges 40 and 41 respectively.

A pair of rear removable track members 42 and 43 are adapted to engage on the upper surfaces of the track members 20 and 21 respectively, and the track members 42 and 43 have secured to the under surface thereof a pair of cleats 44 and 45 respectively, which are engageable in transversely disposed grooves 46 and 47 formed in the tracks 20 and 21 respectively. The forward ends of the track members 42 and 43 are upwardly beveled, as at 48, so that the forward ends of these track members will lie snugly against the upwardly inclined surfaces 24 of the track members 22 and 23. In this manner the track members 42 and 43 provide a filler so that when it is necessary to use the upper track or block 34 the truck will not be required to ride upwardly over the inclined surfaces 24 and 28. A pair of forward track members 49 are disposed forwardly of the track members 22 and 23, as shown in Figures 2 and 5, and these track members 49 engage on the track members 20 and 21. These track members 49 are formed with a downwardly and forwardly inclined forward end 50 and a downwardly and rearwardly inclined rear end 51. An intermediate pair of track members 52 are disposed between the forward track members 49 and the track members 22 and 23 and the intermediate track members 52 are formed with complementary tapered rear and front ends 53 and 54, which are adapted to snugly engage the tapered ends 25 and 51 so that the upper surface of the intermediate track member 52 will be flush with the upper flat surfaces of the track members 22 and 49. The intermediate track member 52 has secured to the under side thereof a cleat 55, which is engageable in a transverse groove 56 formed in the lower track member 20. An auxiliary or filler track 57 is engageable on both the forward track 49 and the intermediate track or filler 52. The forward end 58 of the track 57 is tapered on the same inclination as the tapered end 50 of the track 49 and the rear end of the track 57 is tapered, as at 59, on the same inclination as the tapered end 29. In this manner when the track or filler 57 is in operative position the upper surface thereof will be flush with the upper surface of the auxiliary track 26. The track or filler 57 has secured to the under surface thereof a pair of cleats 60 and 61. The cleat 60 is engageable in a transverse groove 62 formed in the track 49 and the cleat 61 is engageable in a groove 63 formed in the intermediate track 52. A ramp 64 is engageable with the forward ends of the tracks 20 and 21 and is formed with an inclined rear portion 65 adapted to snugly engage the inclined forward end 50 of the track 49. The filler or forward track 57 is adapted to be used when the upper track or block 34 is used so that when the wheels of the truck or vehicle ride downwardly from the block 34, there will not be as great a drop as would be the case with the filler or upper block 57 not in use.

The frame structure 10 at the rear thereof has mounted on top of the rails 16 and 18 a pair of blocks 66 and 67, which are formed with flat upper surfaces 68 and 69 respectively extending from their rear ends. The blocks 66 and 67 are also formed at their forward ends with downwardly inclined surfaces 70 and 71 respectively. A metal strip 72 is secured to the upper surface 68 of the block 66 and extends downwardly over the inclined forward surface 70, as shown in Figure 2. A similar metal strip 73 is secured to the upper surface of the block 67 and is formed with a flat surface 74 engaging the flat surface 69 and also with a downwardly and forwardly inclined surface 75 engaging in the inclined surface 71.

The block 66 is held against lateral shifting with respect to the rail 16 by means of a pair of guide plates 76, which are secured to the opposite sides of the block 16 and extend downwardly and overlap the opposite sides of the rail 16. The block 67 has secured to the opposite sides thereof a pair of guide plates 77, which extend downwardly over the opposite sides of the rail 18, as shown in Figure 3. The block 66 is held against endwise movement relative to the beam 16 by means of one or more pegs 78, which are carried by the block 66 and engage in an opening 79 formed in the rail 16.

The block 67 is held against endwise movement relative to the rail 18 by means of one or more pegs or pins 80, which are carried by the block 67 and engage in an opening 81 formed in the rail 18. The block 66 has secured to the outer side thereof a U-shaped socket 82, which is formed with laterally extending ears 83, which are fixed in any suitable manner to the outer side of the block 66. A load holding stake structure 84 is adapted to engage over the top of the block 66 and comprises a vertical stake member 85 fixed to a horizontal member 86. The horizontal member 86 engages the metal strip 72 and terminates in a downwardly extending supporting leg 87, which engages in the socket 82. A bracing member 88 connects the stake or upright 85 with the outer end of the horizontal member 86.

The block 67 has secured to the outer side thereof a stake holding socket 89, which is formed with a pair of laterally extending ears 90, which are fixed to the outer side of the block 67. A stake member, generally designated as 91, is removably engaged with the socket 89 and comprises an upright load supporting stake 92 formed with a horizontal lateral extension 93 terminating in a depending leg 94. The leg 94 engages in the socket 89 and the extension 93 engages on the upper surface of the metal strip 73, as shown in Figure 3. A bracing member 95 connects the upright stake member 92 with the outer end of the horizontal extension 93. The two socket members 82 and 89 are adapted to be positioned closely adjacent the forward ends of the flat surfaces of the blocks 66 and 67, as shown in Figure 2.

The forward ends of the two side members 11 and 12 have mounted thereon a pair of forward blocks 96 and 97, which are held against endwise movement relative to the rails 16 and 18 by means of pegs 98 and 99 respectively. The pegs 98 and 99 engage in recesses 100 and 101 respectively, which are formed in the rails 16 and 18 respectively. The blocks 96 and 97 are of similar construction and each block is formed adjacent the rear thereof with a horizontal flat surface 102, which merges into a downwardly inclined surface 103. The downwardly inclined surface 103 is substantially longer than the length of the horizontal surface 102 and this inclined surface 103 is also longer than the inclined surfaces 70 and 71 of the blocks 66 and 67. The inclination of the surface 103 is more gradual than the inclination of the surfaces 70 and 71, the purpose for which will be hereinafter described. The block 96 has mounted on the upper surface thereof a metal strip 104 and the block 97 has mounted on the upper surface thereof a metal strip 105. These metal strips comprise wear surfaces the purposes for which will be hereinafter described. The blocks 96 on the outer side thereof has fixed thereto a stake socket 106 and the block 97 has fixed to the outer side thereof a stake socket 107. A stake 108 is engageable in the socket 106 and a stake 109 is engageable in the socket 107.

A rear loading bar 110 is adapted to engage the upper surfaces of the two blocks 66 and 67 and preferably this rear load supporting bar 110 is round in transverse section and constitutes a roller, which is adapted to engage between the load and the blocks 66 and 67. A forward load supporting bar or member 111 is engageable with the blocks 96 and 97 and preferably the load supporting bar 111 is square in transverse section and has fixed to the under side thereof a pair of wedge members 112, which are adapted to slide over the metal strips 104 and 105 and which are adapted to hold the bar 111 with the rear side thereof vertical. As shown in Figure 2, the bar 111 is adapted to engage at its forward side against the two stakes or stop members 108 and 109 and in this position the wedge members 112 are engaged with the upper or rear ends of the inclined faces 103 of the forward blocks 96 and 97. The load supporting bar 111 on its rear side has fixed thereto a pair of stake holding sockets 113 in which stakes 114 are adapted to removably engage. The sockets 113 are spaced apart a distance substantially equal to the distance between the stakes 85 and 92.

In the event it is determined prior to the transfer of the load that the bolsters of the truck will not be able to pass beneath the rear rail 110, a pair of shims 115 and 116 may be interposed between the blocks 66 and 67 and the rails 16 and 18 respectively. Similar shims 117 may be interposed between the forward blocks 96 and 97 and the rails 16 and 18 so as to raise the load supporting bar 111 to the desired height.

In the use and operation of this device the load is placed on top of the two load supporting members 110 and 111 with these members in substantially the position shown in Figure 2. The load line is designated by the dot and dash line 118 in Figure 2. The truck or trailer structure is backed over the ramp 64 and initially the elevating track members 26 and 27 may be removed from the track members 20 and 21 so that the rear and front bolsters 119 and 120 respectively will not contact with the load. After the rear wheels 121 have passed over the track 22 the track members 26 and 27 may be placed in position on top of the tracks 22 and 23 so that when the front wheels 122 engage the track members 26 and 27, the front bolster 120 will contact with the load rearwardly of the load supporting bar 111. This is the position of the two bolsters 119 and 120, which is shown by the dot and dash line in Figure 2. The load is adapted to be tied or otherwise secured to the front bolster 120 and the truck may then move forwardly in a direction shown by the arrow 123. The stakes 108 and 109 are removed before the truck is moved forwardly so that the load supporting bar 111 may freely slide forwardly and downwardly over the blocks 96 and 97. The forward movement of the load will cause the roller 110 to move forwardly and prior to the time that the bar 111 is disengaged from the blocks 96 and 97, the roller 110 will slide down the sharply inclined surfaces 70 and 71 so as to engage the load with the rear bolster 119. In this position the roller 110 will drop down onto the rails 16 and 18 and the rear bolster will be in the position shown by the dotted line position in Figure 2. The front bolster 120 will be in the position shown in the dotted line position in Figure 2 and at this time the front supporting member 111 will be still engaged with the blocks 96 and 97 but the bolster 120 will be at least partly carrying the front portion of the load so that when the supporting member 111 is disengaged from the blocks 96 and 97 there will not be a sudden drop of the load. The blocks 96 and 97 are of such a length that when the bar 111 reaches the forward ends thereof the front bolster 120 will be substantially carrying the forward end of the load so that there will not be any appreciable drop in the front end of the load.

In the event that during the entrance of the truck or trailer into the frame 10 the front bolster 120 will not be elevated sufficiently to engage the load, the upper block or track member 34 may be mounted on the track 22 and the upper block 39 may be mounted on the track 27. Under certain conditions during the entrance of the truck into the frame 10, it may be necessary to cause the bolsters to drop downwardly as they pass the forward bar 111. This may be accomplished by removing the intermediate track members 52 so that the wheels 121 and 122 may drop downwardly before they ride upwardly over the inclined ends 25 and 29 of the track members 22 and 26 respectively. After the wheels 122 are on top of the track 26 the intermediate blocks 52 may be reinserted so that when the truck or trailer is loaded, the wheels will not ride downwardly as great a distance in removing the load as they did in entering the frame while the truck or bolsters were empty.

A device constructed according to this invention will permit the quick loading of a truck whether the truck be provided with a platform or be provided with bolsters. The material is initially placed on the supporting bars 110 and 111 and after this has been done the truck driver may remove the load without further help, as the load may be removed as hereinbefore described by only one person. The load supporting bar 111 will be disposed on the truck rearwardly of the cab after the load has been taken, but will be loose beneath the load and frame of the truck so that the driver can readily pull this supporting member out from beneath the load. However, the load supporting bar 110 will remain on the supporting rails 16 and 18 in substantially the dotted position shown in Figure 2.

What I claim is:

1. A vehicle loading device comprising a load supporting frame including vertical side members, each of said side members having a horizontal upper edge, a combined load supporting and load delivering block carried by the upper edge of each of said side members adjacent one end thereof, a second pair of combined load supporting and load delivering blocks carried by the upper edges of said side members adjacent the opposite ends thereof, a pair of load supporting bars engageable one with each pair of blocks, and a track structure between said side members formed with vehicle elevating means for raising at least a portion of the unloaded vehicle into substantial contact with the load.

2. A vehicle loading device comprising a frame, pairs of spaced apart combined load supporting and load delivering members carried by said frame and including load delivering means, means engageable with said members supporting the load from said members, said second means being movable relative to said members during the delivery of the load to the vehicle, and a track in said frame over which the vehicle wheels are adapted to move, said track including means intermediate the ends of the frame for elevating a portion of the vehicle to substantially load contacting relation whereby further movement of the vehicle relative to the frame will effect movement of the load relative to said supporting members to thereby lower the load onto the vehicle.

3. A vehicle loading device comprising a frame, pairs of spaced apart combined load supporting and load delivering members carried by said frame, said members having flat horizontal upper faces merging into downwardly and forwardly inclined forward portions, means engageable with said members supporting the load from said members, said means being movable relative to said members during the delivery of the load to the vehicle, and a track in said frame over which the vehicle wheels are adapted to move, said track including means intermediate the ends of the frame for elevating a portion of the vehicle to substantially load contacting relation whereby further movement of the vehicle relative to the frame will effect movement of the load relative to said supporting members to thereby lower the load onto the vehicle.

4. A vehicle loading device comprising a frame, pairs of spaced apart combined load supporting and load delivering members carried by said frame, said members having flat horizontal upper faces and downwardly and forwardly inclined forward portions, the inclined forward portions of the forward pairs of said members being substantially longer than the inclined forward portions of the rear pair of said members, means engageable with said members supporting the load from said members, said means being movable relative to said members during the delivery of the load to the vehicle, and a track in said frame over which the vehicle wheels are adapted to move, said track including means intermediate the ends of the frame for elevating a portion of the vehicle to substantially load contacting relation whereby further movement of the vehicle relative to the frame will effect movement of the load relative to said supporting members to thereby lower the load onto the vehicle.

5. A vehicle loading device comprising a frame, pairs of spaced apart combined load supporting and load delivering members carried by said frame, said members having flat horizontal upper faces and downwardly and forwardly inclined forward portions, the inclined forward portions of the forward pairs of said members being substantially longer than the inclined forward portions of the rear pair of said members, said rear pair of members being substantially higher than said forward pair of members, means engageable with said members supporting the load from said members, said means being movable relative to said members during the delivery of the load to the vehicle, and a track in said frame over which the vehicle wheels are adapted to move, said track including means intermediate the ends of the frame for elevating a portion of the vehicle to substantially load contacting relation whereby further movement of the vehicle relative to the frame will effect movement of the load relative to said supporting members to thereby lower the load onto the vehicle.

6. A vehicle loading device comprising a frame, pairs of spaced apart combined load supporting and load delivering members carried by said frame, said members having flat horizontal upper faces and downwardly and forwardly inclined forward portions, the inclined forward portions of the forward pairs of said members being substantially longer than the inclined forward portions of the rear pair of said members, said rear pair of members being substantially higher than said forward pair of members, the forward inclined portions of said rear pair of members being disposed on a sharper angle than the forward portions of said forward members, means engageable with said members supporting the load from said members, said means being movable relative to said members during the delivery of the load to the vehicle, and a track in said frame over which the vehicle wheels are adapted to move, said track including means intermediate the ends of the frame for elevating a portion of the vehicle to substantially load contacting relation whereby further movement of the vehicle relative to the frame will effect movement of the load relative to said supporting members to thereby lower the load onto the vehicle.

7. A vehicle loading device comprising a frame, pairs of spaced apart combined load supporting and load delivering members carried by said frame, said members having horizontal upper faces and downwardly and forwardly inclined load delivering faces, a rear cylindrical load supporting bar movably engageable with one pair of said members and initially engageable with the horizontal faces thereof, a forward load supporting bar having a flat lower surface engageable with another pair of said members and initially disposed on the inclined load delivering faces thereof, releasable means holding said forward bar against movement, and means in said frame elevating the forward portion of the vehicle into contacting relation with the load whereby forward movement of the vehicle will effect downward movement of the load over said delivering faces to thereby deliver the load from said members to the vehicle.

8. A vehicle loading device comprising a frame, pairs of spaced apart combined load supporting and load delivering members carried by said frame, said members having horizontal upper faces and downwardly and forwardly inclined load delivering faces, a rear cylindrical load supporting bar movably engageable with one pair of said members and initially engageable with the horizontal faces thereof, a forward load supporting bar having a flat lower surface, wedges carried by said flat lower surfaces of said forward bar engageable with another pair of said members and initially disposed on the inclined load delivering faces thereof whereby to maintain the rear side of said forward bar in a vertical position, releasable means holding said forward bar against movement, and means in said frame elevating the forward portion of the vehicle into contacting relation with the load whereby forward movement of the vehicle will effect downward movement of the load over said delivering faces to thereby deliver the load from said members to the vehicle.

9. A vehicle loading device comprising a frame, pairs of spaced apart combined load supporting and load delivering members carried by said frame, said members having horizontal upper faces and downwardly and forwardly inclined load delivering faces, a rear cylindrical load supporting bar movably engageable with one pair of said members and initially engageable with the horizontal faces thereof, a forward load supporting bar having a flat lower surface engageable with another pair of said members and initially disposed on the inclined load delivering faces thereof, releasable means holding said forward bar against movement, means in said frame elevating the forward portion of the vehicle into contacting relation with the load whereby forward movement of the vehicle will effect downward movement of the load over said delivering faces to thereby deliver the load from said members to the vehicle, a pair of stake sockets carried by said forward bar, and a pair of load engaging stakes releasably engageable in said sockets.

10. A vehicle loading device comprising a frame, pairs of spaced apart combined load supporting and load delivering members carried by said frame, said members having horizontal upper faces and downwardly and forwardly inclined load delivering faces, a rear load supporting bar movably engageable with one pair of said members and initially engageable with the horizontal faces thereof, a forward load supporting bar engageable with the horizontal faces of another pair of said members, means engageable with certain of said members for holding one of said load supporting bars against movement in at least one direction, and means in said frame for elevating the forward portion of the vehicle into substantially contacting relation with the load whereby forward movement of the vehicle will effect forward and downward movement of the load over said delivering faces to thereby deliver the load from said members to the vehicle.

COY I. CROW.